(12) United States Patent
Iida et al.

(10) Patent No.: US 10,753,271 B2
(45) Date of Patent: Aug. 25, 2020

(54) SYSTEM FOR CONTROLING INTERNAL COMBUSTION ENGINE

(71) Applicant: HONDA MOTOR CO., LTD., Tokyo (JP)

(72) Inventors: Tetsuya Iida, Wako (JP); Yujiro Tsutsumi, Wako (JP); Ayumu Horiba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 16/177,906

(22) Filed: Nov. 1, 2018

(65) Prior Publication Data

US 2019/0136751 A1 May 9, 2019

(30) Foreign Application Priority Data

Nov. 6, 2017 (JP) ................................. 2017-213712

(51) Int. Cl.
*F02B 37/16* (2006.01)
*F02B 37/12* (2006.01)

(52) U.S. Cl.
CPC ........ *F02B 37/16* (2013.01); *F02B 2037/125* (2013.01)

(58) Field of Classification Search
CPC ............................ F02B 37/16; F02B 2037/125
USPC .......................... 60/611, 605.1; 701/103–104
See application file for complete search history.

(56) References Cited

U.S. PATENT DOCUMENTS

| 7,918,090 B2* | 4/2011 | Suzuki | F02D 41/0007 |
| | | | 60/611 |
| 9,739,220 B2* | 8/2017 | Matsubara | F02B 37/16 |
| 10,100,722 B2* | 10/2018 | Nishio | F02B 37/16 |
| 2006/0248889 A1* | 11/2006 | Sagisaka | F02D 41/221 |
| | | | 60/605.1 |
| 2011/0167816 A1* | 7/2011 | Tomita | F02B 37/16 |
| | | | 60/611 |

(Continued)

FOREIGN PATENT DOCUMENTS

| JP | 2017-061913 A | 3/2017 |
| JP | 2017-082600 A | 5/2017 |
| WO | 2015/145942 A1 | 10/2015 |

OTHER PUBLICATIONS

Office Action dated May 21, 2019, issued in JP Application No. 2017-213712, with English translation (8 pages).

(Continued)

*Primary Examiner* — Thai Ba Trieu
(74) *Attorney, Agent, or Firm* — Westerman, Hattori, Daniels & Adrian, LLP

(57) ABSTRACT

In a system for controlling an internal combustion engine, first opening determination of determining whether to open an air bypass valve 22 on the basis of a compressor flow rate (target compressor flow rate QAIRCMD) passing through a compressor 17 and a compressor front-rear pressure ratio P2/P1, and second opening determination of determining whether to open the air bypass valve 22 on the basis of an opening ratio reduction amount DRTHO as a reduction amount of an opening ratio RTHO of a throttle valve 13 are performed. The air bypass valve 22 is opened when it is determined in both of the first opening determination and the second opening determination that the air bypass valve 22 should be opened.

2 Claims, 6 Drawing Sheets

(56) References Cited

U.S. PATENT DOCUMENTS

| | | | | |
|---|---|---|---|---|
| 2011/0231081 A1* | 9/2011 | Suzuki | ............... | F02D 41/0235 |
| | | | | 701/104 |
| 2014/0157774 A1* | 6/2014 | McConville | .......... | F02B 37/164 |
| | | | | 60/611 |
| 2016/0131065 A1* | 5/2016 | Ossareh | .............. | F02D 41/0007 |
| | | | | 701/103 |
| 2016/0169091 A1* | 6/2016 | Banker | ............... | F02D 41/0007 |
| | | | | 701/103 |
| 2017/0089276 A1* | 3/2017 | Sunagare | ............ | F02D 41/0007 |
| 2017/0114736 A1* | 4/2017 | Iida | .................... | F02D 41/0007 |
| 2017/0122241 A1* | 5/2017 | Xiao | ................... | F02D 41/0007 |
| 2017/0145907 A1* | 5/2017 | Nishio | ................ | F02D 41/0007 |
| 2017/0234210 A1* | 8/2017 | Ohisa | ................. | F02D 41/0007 |
| | | | | 60/611 |
| 2017/0234247 A1* | 8/2017 | Ohisa | ................. | F02D 41/0007 |
| | | | | 701/103 |
| 2017/0276063 A1* | 9/2017 | Shiwa | ..................... | F02B 37/16 |
| 2018/0100456 A1* | 4/2018 | Yokono | ................... | F02B 37/16 |
| 2018/0363541 A1* | 12/2018 | Sase | ........................ | F02B 37/16 |

OTHER PUBLICATIONS

Office Action dated Oct. 1, 2019, issued in counterpart JP Application No. 2017-213712, with English translation. (6 pages).

* cited by examiner

SYSTEM FOR CONTROLING INTERNAL COMBUSTION ENGINE

CROSS-REFERENCE OF RELATED APPLICATION

This application claims priority of Japanese Patent Application No. 2017-213712 filed in Japan on Nov. 6, 2017, the entire contents of which incorporated herein by reference.

TECHNICAL FIELD

The present invention relates to a system with a controller of an internal combustion engine including a turbocharger having a compressor that compresses intake air, and an air bypass valve that opens and closes a bypass passage that bypasses the compressor.

BACKGROUND OF THE INVENTION

In an internal combustion engine having a turbocharger, when a throttle valve arranged on the downstream side of a compressor is closed during a transition period from turbocharged operation to deceleration operation, the turbocharge pressure on the downstream side of the compressor increases even more between the compressor and the throttle valve, and the flow rate of air passing through the compressor is reduced. For this reason, surging of the compressor occurs which air flows back from the downstream side to the upstream side of the compressor. This causes noise and vibration, or trouble such as adverse effects on parts of the compressor.

To prevent such surging, a conventional controller disclosed in International Patent Application Publication No. WO 2015/145942 has been known, for example. In the controller, the flow rate of air passing through a compressor (compressor flow rate) and a pressure ratio between upstream and downstream sides of the compressor (compressor pressure ratio) are detected, and an amount of change in the compressor flow rate is calculated. Additionally, threshold of the amount of change in the flow rate is calculated on the basis of the detected compressor flow rate and compressor pressure ratio. Then, when the calculated amount of change in the compressor flow rate exceeds the threshold, it is determined that a surge will occur, and an air bypass valve is opened to prevent surging.

As described above, surging of a compressor occurs when a closing operation of a throttle valve during deceleration from a turbocharged operation causes the turbocharge pressure on the downstream side of the compressor to increase even more between the compressor and the throttle valve, and reduces the compressor flow rate. However, reduction of the compressor flow rate occurs even when the opening of the throttle valve is unchanged, such as when an operation state of a waste gate valve provided on the exhaust side of the turbocharger is changed, or when the engine speed is controlled to the reduction side at the time of a gear change.

Meanwhile, in the conventional controller, occurrence of surging is determined on the basis of the compressor flow rate and the compressor pressure ratio. Hence, if the compressor flow rate drops in a state as mentioned above where the opening of the throttle valve is unchanged, the controller erroneously determines that surging will occur and opens the air bypass valve, even though surging is not likely to happen. As a result, unintended torque-down occurs, whereby drivability is impaired, and frequent actuation of the air bypass valve reduces life.

There is a need to solve such problems by providing a controller of an internal combustion engine that can accurately determine the likelihood of occurrence of surging, to thereby avoid unnecessary opening of an air bypass valve and suppress frequent actuation, while surely preventing occurrence of surging.

SUMMARY OF THE INVENTION

In a first embodiment, the present invention provides a system for controlling an internal combustion engine 3 characterized by including: a turbocharger (turbocharger 9 in the embodiment (the same applies hereinafter in this section)) having a compressor 17 for compressing intake air in an intake passage 7; an air bypass valve 22 that opens and closes a bypass passage 21 that bypasses the compressor 17; compressor flow rate acquisition means (ECU 2, step 11 of FIG. 5) that acquires a compressor flow rate (target compressor flow rate QAIRCMD) as a flow rate of air passing through the compressor 17; compressor pressure ratio detection means (upstream pressure sensor 33, turbocharge pressure sensor 34) that detects a compressor pressure ratio (compressor front-rear pressure ratio P2/P1) as a pressure ratio between upstream and downstream of the compressor 17; throttle valve opening parameter acquisition means (throttle valve opening sensor 30, crank angle sensor 35, ECU 2, step 22 of FIG. 7) that acquires a throttle valve opening parameter (opening ratio RTHO) indicating an opening (an opening amount or degree) of a throttle valve 13 arranged on the downstream side of the compressor 17 in the intake passage 7; first opening determination means (ECU 2, step 1 of FIG. 3, FIG. 5) that determines whether to open the air bypass valve 22, on the basis of the acquired compressor flow rate and the detected compressor pressure ratio; second opening determination means (ECU 2, step 2 of FIG. 3, FIG. 7) that determines whether to open the air bypass valve 22, on the basis of an amount of change (opening ratio reduction amount DRTHO) in the acquired throttle valve opening parameter; and air bypass valve control means (ECU 2, steps 3 to 6 of FIG. 3) that opens the air bypass valve 22 when both of the first opening determination means and the second opening determination means determine that the air bypass valve 22 should be opened, and prohibits opening of the air bypass valve 22 when at least one of the determination means determines that the air bypass valve 22 should not be opened.

In the system of controlling an internal combustion engine according to the present invention, a compressor flow rate (flow rate of air passing through a compressor) is acquired, and a compressor pressure ratio (pressure ratio between upstream and downstream of the compressor) is detected, and first opening determination means determines (referred to as "first opening determination" below) whether to open an air bypass valve, on the basis of the compressor flow rate and the compressor pressure ratio. Also, a throttle valve opening parameter indicating the opening of a throttle valve arranged on the downstream side of the compressor is acquired, and second opening determination means determines (referred to as "second opening determination" below) whether to open the air bypass valve, on the basis of the amount of change in the throttle valve opening parameter. Then, the air bypass valve is opened both of the first and second opening determination means determine that the air bypass valve should be opened, and opening of the air bypass valve is prohibited if at least one of the determination means determines that the air bypass valve should not be opened.

According to this configuration, when the flow rate of a compressor decreases while the opening of the throttle valve is unchanged, for example, in the first opening determination based on the compressor flow rate, it may be erroneously determined that the air bypass valve should be opened, even though the likelihood of occurrence of surging is low. In this case, it is determined in the second opening determination based on the amount of change in the throttle valve opening parameter, that the air bypass valve should not be opened. As a result, opening of the air bypass valve is prohibited.

Meanwhile, when the compressor flow rate is hardly decreased while the throttle valve is closed, for example, in the second opening determination, it may be erroneously determined that the air bypass valve should be opened, even though the likelihood of occurrence of surging is low. In this case, it is determined in the first opening determination that the air bypass valve should not be opened, and as a result, opening of the air bypass valve is prohibited.

As has been described, by using both of the first opening determination and the second opening determination, the likelihood of occurrence of surging can be determined accurately while avoiding erroneous determination using only one opening determination. Accordingly, unnecessary opening of the air bypass valve can be avoided, frequent actuation thereof can be suppressed, and occurrence of surging can be surely prevented. Note that "acquisition" referred to in "acquire compressor flow rate" and "acquire throttle valve opening parameter" in the first embodiment includes direct detection by a sensor or the like, calculation, estimation, or setting on the basis of other parameters.

In a second embodiment, the present invention provides the system of controlling an internal combustion engine 3 as described in first embodiment further characterized by including speed detection means (crank angle sensor 35) that detects a speed (engine speed NE) of the internal combustion engine 3, in which: the throttle valve opening parameter is an opening ratio RTHO of the throttle valve 13 defined as a ratio between a flow rate obtained by an arbitrary opening of the throttle valve, and a maximum flow rate; and the throttle valve opening parameter acquisition means calculates an opening ratio RTHO of the throttle valve 13 according to the detected speed of the internal combustion engine 3.

According to this configuration, the opening ratio of the throttle valve is used as a throttle valve opening parameter indicating the opening of the throttle valve. The opening ratio is defined as a ratio between a flow rate obtained by an arbitrary opening of the throttle valve, and the maximum flow rate. Hence, as compared to a physical opening of the throttle valve, the opening ratio accurately expresses the flow rate passing through the throttle valve. Additionally, the opening ratio has a characteristic that it varies according to the speed of the internal combustion engine.

Accordingly, by calculating the opening ratio based on the speed of the internal combustion engine and making the second opening determination on the basis of an amount of change in the calculated opening ratio, the second opening determination can be made accurately while favorably reflecting the degree of variation in the compressor flow rate. As a result, the determination accuracy of occurrence of surging by the first and second opening determinations as a whole is improved, whereby the effect of the first embodiment of avoiding unnecessary opening of the air bypass valve and surely preventing occurrence of surging can be achieved more favorably.

DETAILED DESCRIPTION OF EMBODIMENTS OF THE INVENTION

Figure 1:
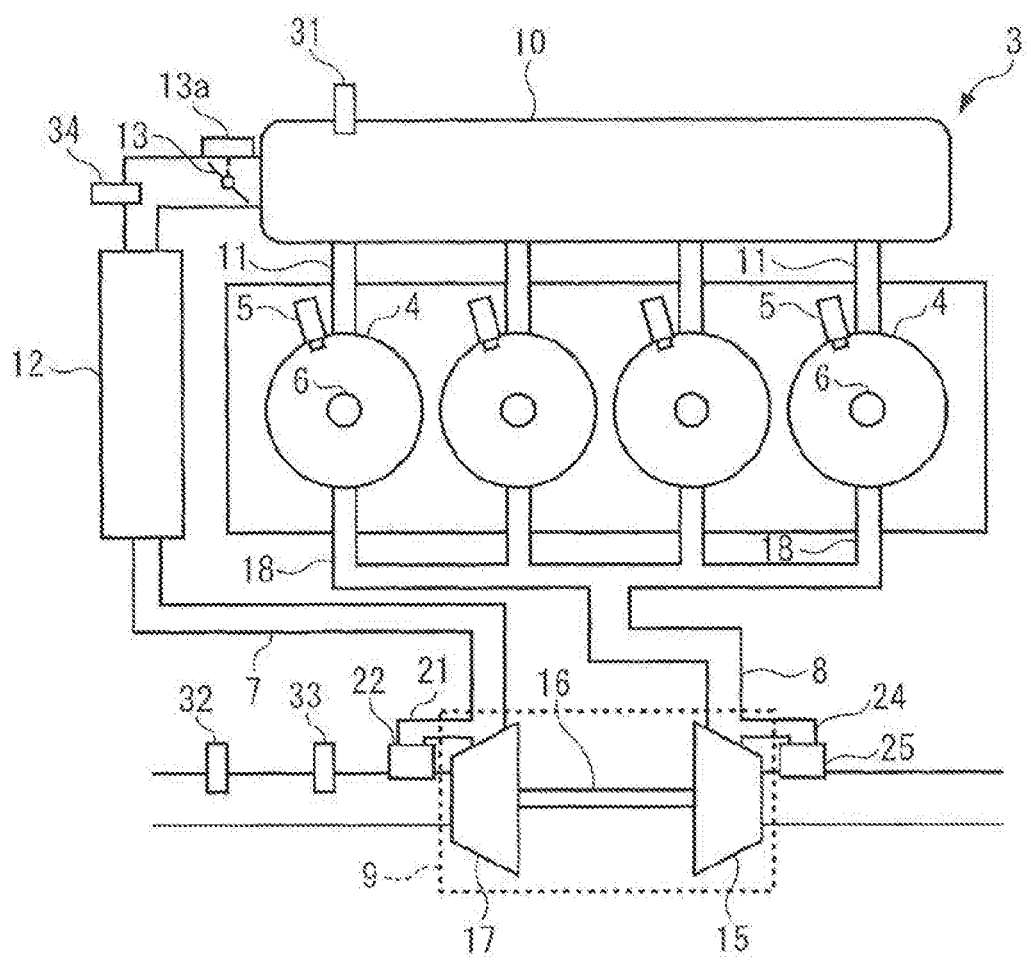
FIG. 1 is a schematic diagram of a system of controlling an internal combustion engine according to one embodiment of the present invention.

Hereinafter, preferred embodiments of the present invention will be described with reference to the drawings. An internal combustion engine (referred to as "engine" below) 3 illustrated in FIG. 1 has four cylinders 4, is a direct-injection gasoline engine in which fuel is directly injected into a combustion chamber (not shown), and is mounted on a vehicle (not shown). Additionally, the engine 3 is connected to a driving wheel and the like through a stepped automatic transmission (none of the parts are shown).

Figure 2:
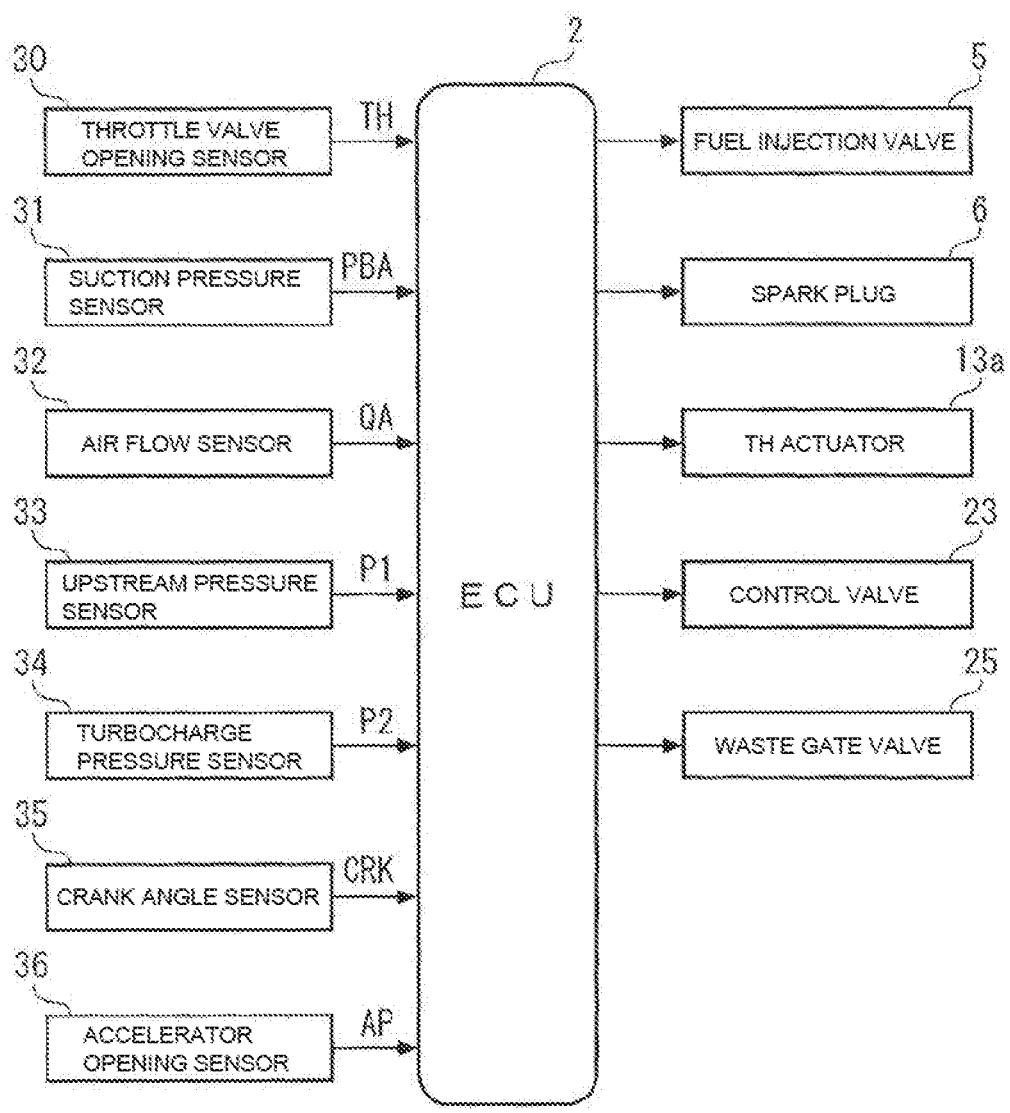
FIG. 2 is a schematic block diagram of a controller used in the system according to the embodiment.

A fuel injection valve 5 and a spark plug 6 are provided in each cylinder 4. An ECU (electronic control unit) 2 (see FIG. 2) controls the open time and open timing of the fuel injection valve 5, and the ignition timing of the spark plug 6.

The engine 3 includes an intake valve, an exhaust valve, and a piston (none of the parts are shown) for each cylinder 4, and also includes an intake passage 7, an exhaust passage 8, and a turbo charger 9. The intake passage 7 is connected to a surge tank 10, and the surge tank 10 is connected to the combustion chamber of each of the cylinders 4 through an intake manifold 11. An intercooler 12 for cooling air compressed by the turbo charger 9, and a throttle valve 13 arranged on the downstream side thereof are provided in the intake passage 7.

The throttle valve 13 is configured of a butterfly valve, and is connected to a TH actuator 13a that drives the throttle value. An operation of the TH actuator 13a is controlled by a control signal from the ECU 2, whereby the opening of the throttle valve 13 is controlled to adjust the amount of intake air sucked into the combustion chamber. An opening (referred to as "throttle valve opening" below) TH of the throttle valve 13 is detected by a throttle valve opening sensor 30. Additionally, a suction pressure sensor 31 for detecting a suction pressure PBA is provided in the surge tank 10, and detection signals of the sensors are input into the ECU 2.

The exhaust passage 8 is connected to the combustion chamber of each of the cylinders 4 of the engine 3 through an exhaust manifold 18. The turbo charger 9 is arranged in the exhaust passage 8, and has a turbine 15 rotated by the operation energy of exhaust gas, and a compressor 17 connected integrally with the turbine 15 through a shaft 16.

The compressor 17 is arranged in the intake passage 7, configured to compress (pressurize) air flowing throng the intake passage 7 to turbocharge intake air.

A bypass passage 21 that bypasses the compressor 17 is connected to the intake passage 7, and an air bypass valve (referred to as "AB valve" below) 22 that opens and closes the bypass passage 21 is provided in the bypass passage 21. An electromagnetic control valve 23 (see FIG. 2) for controlling the AB valve 22 is connected to the AB valve 22. The AB valve 22 is configured of a diaphragm valve, and opening and closing of the AB valve 22 is controlled by controlling ON and OFF of a solenoid of the control valve 23, by control signals from the ECU 2.

On the upstream side of the compressor 17 of the intake passage 7, an airflow sensor 32 that detects a flow rate QA of air flowing through this part is provided. A detection signal of the airflow sensor 32 is input into the ECU 2. When the AB valve 22 is closed, the air flow rate QA is equal to a flow rate (referred to as "compressor flow rate" below) QAIR passing through the compressor 17. In addition, in the intake passage 7, an upstream pressure sensor 33 that detects an upstream pressure P1 is provided on the upstream side of the compressor 17, and a turbocharge pressure sensor 34 that detects a turbocharge pressure P2 is provided between the intercooler 12 and the throttle valve 13. Detection signals of the sensors are input into the ECU 2.

Additionally, a bypass passage 24 that bypasses the turbine 15 is connected to the exhaust passage 8, and a waste gate valve (referred to as "WG valve" below) 25 is provided in the bypass passage 24. The WG valve 25 is electrically driven, for example, and the flow rate of exhaust gas passing through the bypass passage 24 is controlled by controlling the opening of the WG valve by a control signal from the ECU 2.

In addition, the ECU 2 receives input of a CRK signal, which is a pulse signal, from a crank angle sensor 35. The CRK signal is output at every predetermined crank angle (e.g., 30°) along with rotation of a crankshaft. The ECU 2 calculates a speed (referred to as "engine speed" below) NE of the engine 3, on the basis of the CRK signal. The ECU 2 also receives input of a detection signal indicating a depression amount (referred to as "accelerator opening" below) AP of an accelerator pedal (not shown) of the vehicle, from an accelerator opening sensor 36.

The ECU 2 is configured of a microcomputer formed of an input/output interface, a CPU, a RAM, a ROM, and other parts. The ECU 2 performs, in response to detection signals of the aforementioned various sensors 30 to 36 and according to a program stored in the ROM, fuel injection control by the fuel injection valve 5, ignition timing control by the spark plug 6, intake amount control by the throttle valve 13, and engine control including turbocharge control and the like by the AB valve 22 and the WG valve 25. In the embodiment, the ECU 2 corresponds to compressor flow rate acquisition means, throttle valve opening parameter acquisition means, first opening determination means, second opening determination means, and air bypass valve control means.

Figure 3:
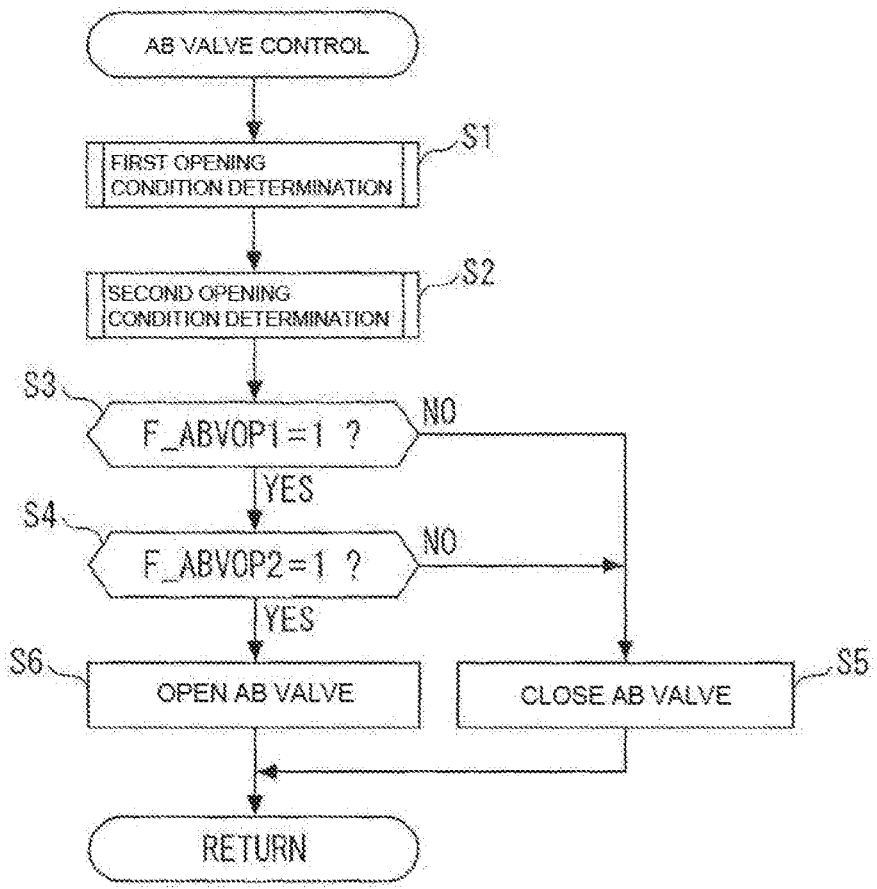
FIG. 3 is a flowchart of air bypass valve control processing performed by the controller.

FIG. 3 shows a main flow of AB valve control processing for controlling opening and closing of the AB valve 22 performed by the ECU 2. The AB valve control processing is performed to control opening of the AB valve 22 to prevent surging of the compressor 17, and is repeatedly performed at a predetermined cycle. Hereinafter, an outline of the AB valve control processing will be described with reference to FIG. 4.

Figure 4:
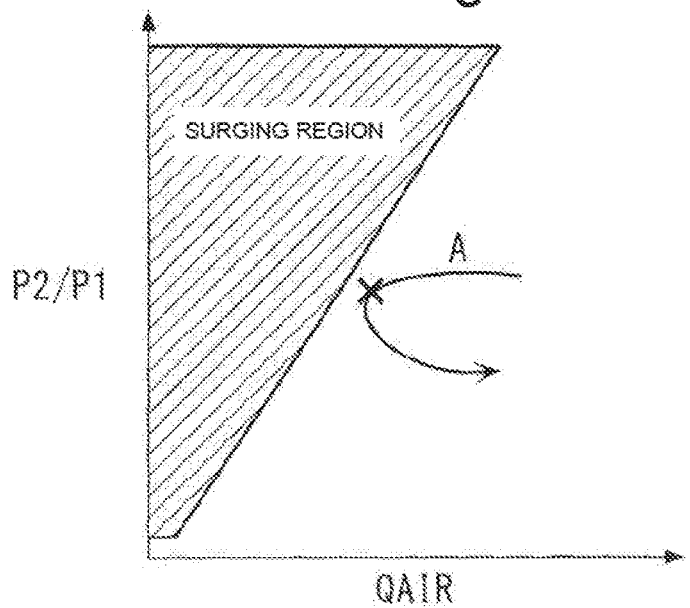
FIG. 4 is a diagram for describing an outline of air bypass valve control processing.

FIG. 4 shows a compressor map in which the compressor flow rate QAIR is indicated by the horizontal axis, and a compressor front-rear pressure ratio P2/P1 is indicated by the vertical axis. Surging of the compressor 17 is more likely to happen when the difference between the downstream side pressure (turbocharge pressure P2) and the upstream side pressure (upstream pressure P1) of the compressor 17 is large, and when the compressor flow rate QAIR is small. According to this relationship, a surging region where surging occurs is indicated by a hatched region in the compressor map of FIG. 4.

When the compressor flow rate QAIR is reduced, AB valve control processing is performed toy determine whether an operation point of the compressor 17 is likely to enter the surging region and surging is likely to occur, as indicated in arrow A of FIG. 4. If it is determined that surging is likely to occur, the AB valve 22 is opened (e.g., x sign in FIG. 4) to prevent occurrence of surging.

In AB valve control processing of FIG. 3, in step 1 (indicated as "S1" in FIG. 3, the same applies hereinafter) and step 2, first opening condition determination processing and second opening condition determination processing are performed, respectively. The first opening condition determination processing is performed to determine whether the AB valve 22 should be opened, on the basis of a relationship between an operation point and the surging region on a compressor map as shown in FIG. 4. Meanwhile, the second opening condition determination processing is performed to determine whether the AB valve 22 should be opened, on the basis of the state of reduction of the throttle valve opening TH.

Figure 5:
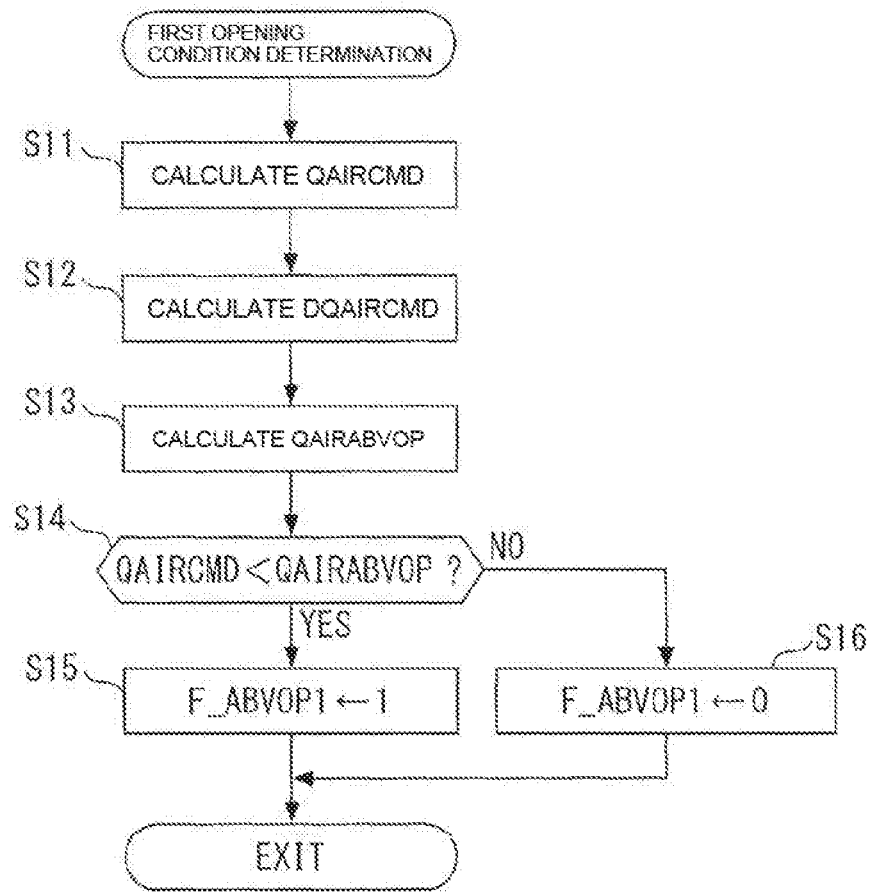
FIG. 5 is a flowchart of a first opening determination processing of the air bypass valve control processing.

FIG. 5 shows a subroutine of the first opening condition determination processing. In the processing, first, in step 11, a target compressor flow rate QAIRCMD as a target value of the compressor flow rate QAIR is calculated and stored. Specifically, the target compressor flow rate QAIRCMD is calculated by searching a predetermined map (not shown) according to a required torque TRQ required for the engine 3 and the engine speed NE. Note that the required torque TRQ is calculated to be substantially proportional to the accelerator opening AP by searching a predetermined map (not shown) according to the accelerator opening AP and the engine speed NE. Note that when the target compressor flow rate QAIRCMD is calculated by different processing, the calculated value may be used.

Next, in step 12, a flow rate reduction amount DQAIRCMD as a reduced amount of the target compressor flow rate QAIRCMD is calculated. Specifically, the difference between a target compressor flow rate QAIRCMD calculated a predetermined time before the current time and the current target compressor flow rate QAIRCMD is calculated as the flow rate reduction amount DQAIRCMD.

Figure 6:
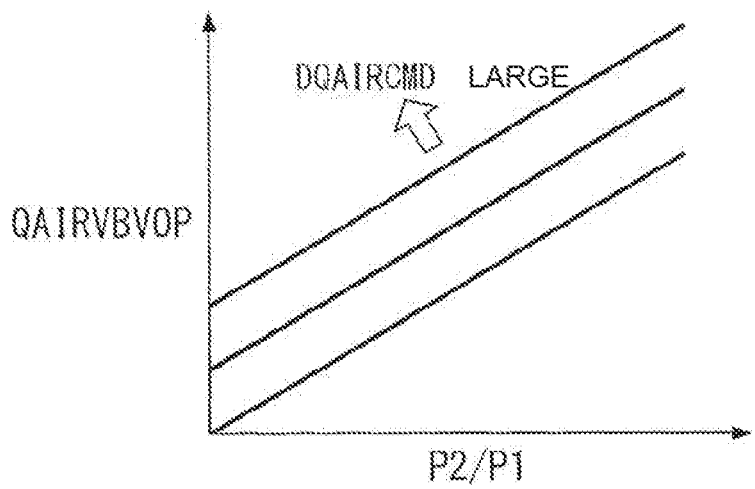
FIG. 6 is a determination value map used in first opening determination processing.

Next, in step 13, a first determination value QAIRABVOP to be compared with the target compressor flow rate QAIRCMD is calculated. Specifically, the first determination value QAIRABVOP is calculated by searching a determination value map shown in FIG. 6, according to the compressor front-rear pressure ratio P2/P1 and the flow rate reduction amount DQAIRCMD calculated in step 12. In the determination value map, the first determination value QAIRABVOP is basically set to a larger value for a larger compressor front-rear pressure ratio P2/P1, to leave a margin for the compressor flow rate to the surging region (see FIG. 9). Additionally, since a larger flow rate reduction amount DQAIRCMD makes it more likely for the operation point of the compressor 17 to enter the surging region, the first determination value QAIRABVOP is set to a larger value.

Next, in step 14, it is determined whether the target compressor flow rate QAIRCMD is smaller than the first determination value QAIRABVOP. If the answer is YES and QAIRCMD<QAIRABVOP is true, the operation point of the compressor 17 may enter the surging region in FIG. 4, and surging may occur. Hence, it is determined that a first opening condition for opening the AB valve 22 is met, a first opening condition flag F_ABVOP1 is set to "1" (step 15), and the processing is ended.

Meanwhile, if the answer in the step 14 is NO and QAIRCMD≥QAIRABVOP is true, surging is not likely to happen. Hence, it is determined that the first opening condition is not met, the first opening condition flag F_ABVOP1 is set to "0" (step 16), and the processing is ended.

Figure 7:
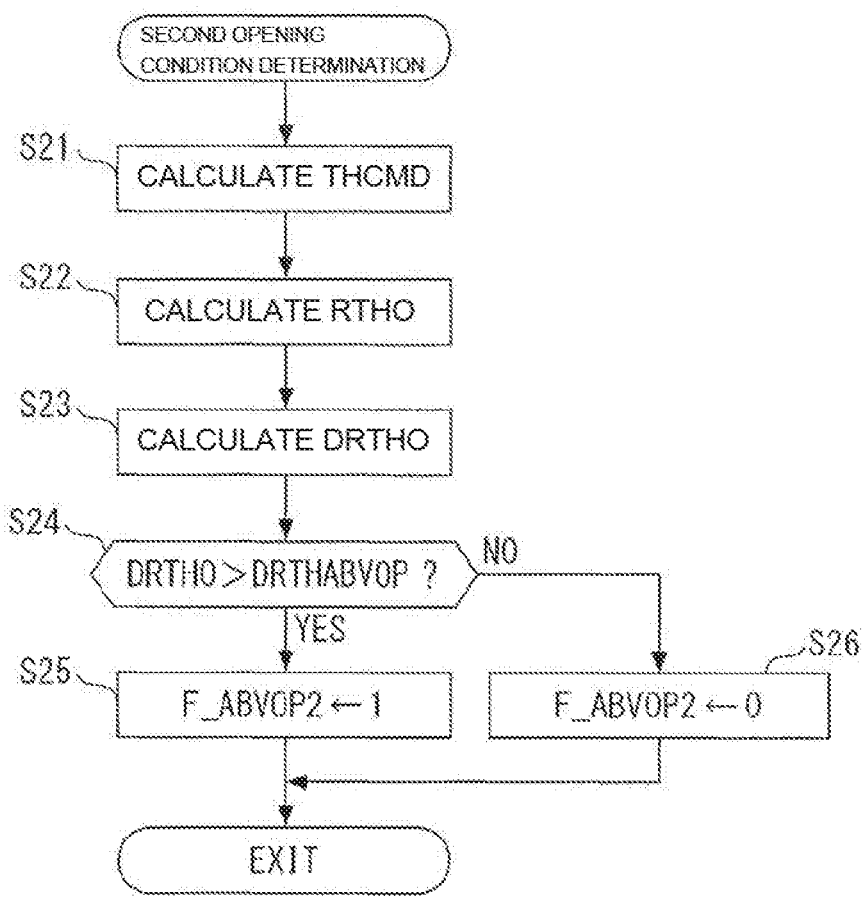
FIG. 7 is a flowchart of a second opening determination processing of the air bypass valve control processing.

FIG. 7 shows a subroutine of the second opening condition determination processing performed in step 2 of FIG. 3. In the processing, first, in step 21, a target throttle valve opening THCMD as a target value of the throttle valve opening TH is calculated and stored. Specifically, the target throttle valve opening THCMD is calculated by searching a predetermined map (not shown) according to the required torque TRQ and the engine speed E. Note that when the target throttle valve opening THCMD is calculated by different processing, the calculated value may be used.

Figure 8:
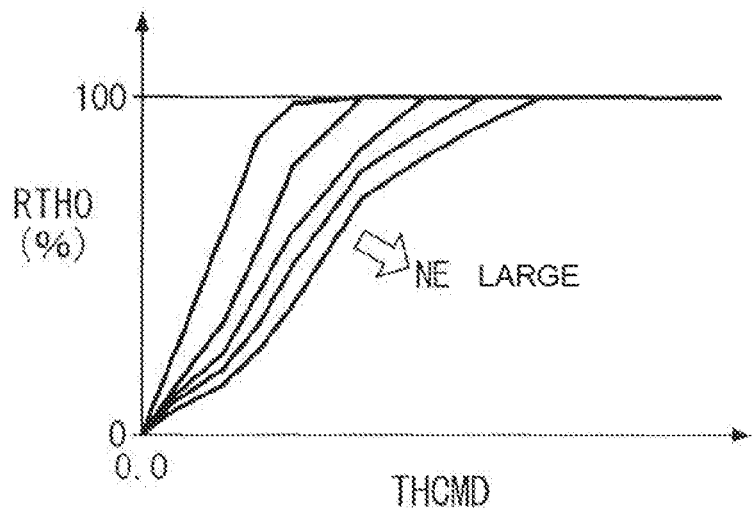
FIG. 8 is an opening ratio map used in second opening determination processing.

Next, in step 22, an opening ratio RTHO of the throttle valve 13 is calculated by searching the opening ratio map shown in FIG. 8, according to engine speed NE and the target throttle valve opening THCMD.

The opening RTHO is defined in the following manner on the basis of a flow rate characteristic of the throttle valve 13. The throttle valve 13 has a flow rate characteristic of reaching a constant maximum flow rate (saturate) when the engine speed NE is constant controlled condition, and the throttle valve opening TH becomes not smaller than a predetermined opening (referred to as "effective opening" below) according to the engine speed NE. Based on the flow rate characteristic, the opening ratio RTHO is expressed as a ratio between a flow rate obtained by the throttle valve opening TH at this time, and the maximum flow rate obtained by the effective opening or larger. The opening ratio RTHO defined in this manner indicates a more accurate flow rate (referred to as "throttle valve flow rate" below) passing through the throttle valve 13, as compared to the physical opening of the throttle valve 13. Additionally, when the AB valve 22 is closed, the throttle valve flow rate is equal to the compressor flow rate QAIR.

The opening ratio map in FIG. 8 was formed by obtaining the aforementioned flow rate characteristic of the throttle valve 13 by way of experiments, for example, and creating a map on the basis of the relationship between the opening ratio RTHO, and the engine speed NE and target throttle valve opening THCMD. As a result, in the opening ratio map, the opening ratio RTHO is set to a smaller value for a higher engine speed NE, and is set to reach the maximum value (100%) (larger effective opening) for a larger target throttle valve opening THCMD.

Referring back to FIG. 7, in step 23 following the step 22, an opening ratio reduction amount DRTHO as a reduced amount of the opening ratio RTHO of the throttle valve 13 is calculated. Specifically, the difference between an opening ratio RTHO calculated a predetermined time before the current time and the current opening ratio RTHO is calculated as the opening ratio reduction amount DRTHO. The opening ratio reduction amount DRTHO indicates a reduction rate (degree) of the throttle valve flow rate (=compressor flow rate QAIR), and a larger value indicates a larger reduction rate of the compressor flow rate QAIR.

Next, it is determined whether the calculated opening ratio reduction amount DRTHO is larger than a predetermined second determination value DRTHOABVOP (step 24). If the answer is YES and DRTHO>DRTHOABVOP is true, it is assumed that the reduction rate of the compressor flow rate QAIR is large, and surging is likely to occur. Hence it is determined that a second opening condition for opening the AB valve 22 is met, a second opening condition flag F_ABVOP2 is set to "1" (step 25), and the processing is ended.

Meanwhile, if the answer in the step 24 is NO and DRTHO≤DRTHOABVOP is true, it is assumed that the reduction rate of the compressor flow rate is small, and surging is not likely to occur. Hence, it is determined that the second opening condition is not met, the second opening condition flag F_ABVOP2 is set to "0" (step 26), and the processing is ended.

Referring back to FIG. 3, after performing the first and second opening condition determination processing in steps 1 and 2, in steps 3 and 4, it is determined whether the first opening condition flag F_ABVOP1 and the second opening condition flag F_ABVOP2 are set to "1". If any of the answers is NO, that is, if at least one of the first opening condition and the second opening condition is not met, surging is not likely to occur, and therefore the AB valve 22 is closed (step 5) to end the processing.

Meanwhile, if both of the answers of the steps 3 and 4 are YES, that is, if both of the first opening condition and the second opening condition are met, surging is likely to occur, and therefore the AB valve 22 is opened (step 6) to end the processing. By thus opening the AB valve 22, the pressure on the downstream side of the compressor 17 is released to the upstream side of the compressor 17 through the air bypass passage 21 and reduced, so that surging can be prevented.

Figure 9:
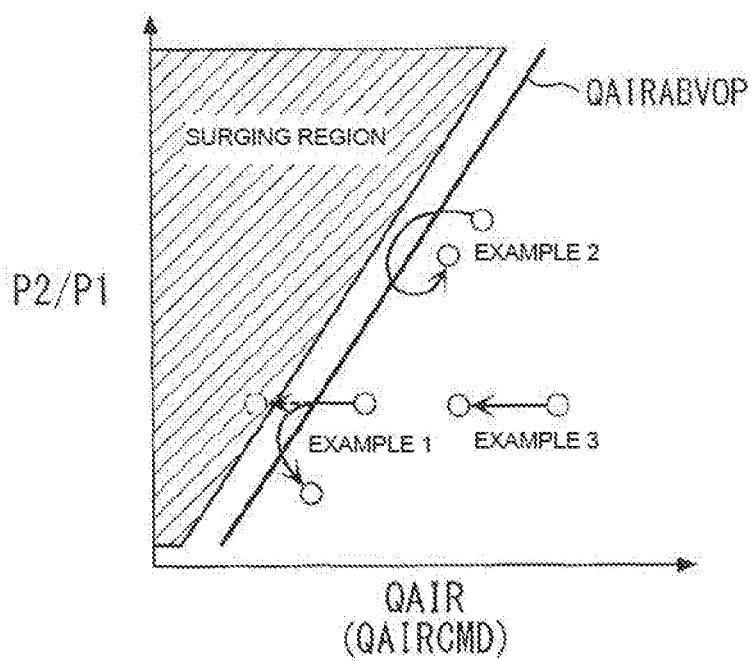
FIG. 9 is a diagram showing an operation example based on air bypass valve control processing.

Hereinafter, an operation example based on the above AB valve control processing will be described with reference to FIG. 9. In the compressor map of FIG. 9, a line indicating the first determination value QAIRABVOP calculated in step 13 of FIG. 5, and operation points indicating three operation examples 1 to 3 are shown.

First, Operation Example 1 is an example where the throttle valve 13 is closed during deceleration from a turbocharge operation of the engine 3, so that the turbocharge pressure P2 increases and the compressor flow rate QAIR decreases. In this state, the operation point is likely to enter the surging region (dotted line in FIG. 9), and surging is likely to occur. In this case, since the throttle valve 13 is closed by the aforementioned AB valve control processing, the second opening condition is met (YES in step 24 of FIG. 7), and the first opening condition is met (YES in step 14 of FIG. 5) when the target compressor flow rate QAIRCMD drops below the first determination value QAIRABVOP.

Since the first and second opening conditions are met, the AB valve 22 is opened (step 6 of FIG. 3), and the compressor front-rear pressure ratio P2/P1 is reduced by releasing the pressure on the downstream side of the compressor 17. Accordingly, the operation point does not enter the surging region but avoids the region (solid line in FIG. 9), whereby occurrence of surging is prevented.

Operation Example 2 is an example Were the compressor flow rate QAIR temporarily decreases for a slight amount while the opening of the throttle valve 13 is unchanged, to a drop in the engine speed NE, at the time of a change in the operation state of the WG valve 25, or up-shifting of an automatic transmission, for example. In this case, even if it is determined that the first opening condition is met since target compressor flow rate QAIRCMD temporarily drops below the first determination value QAIRABVOP, the opening of the throttle valve 13 is unchanged, and therefore it is determined that the second opening condition is not met (NO in step 24 of FIG. 7). As a result, opening of the AB valve 22 is prohibited, and the AB valve 22 is kept closed.

Note that since the opening ratio RTHO that varies according to the engine speed NE is used as the parameter indicating the opening of the throttle valve 13, an increase in the engine speed NE at the time of a downshift of the automatic transmission may reduce the opening ratio RTHO with the throttle valve opening TH unchanged. Then, the opening ratio reduction amount DRTHO may exceed the second determination value DRTHOABVOP, so that the second opening condition is met. In this case, the increase in the engine speed NE increases the compressor flow rate QAIR, and the operation point moves away from the surging region. Hence, the first opening condition is not met, and the AB valve 22 is not opened.

Moreover, operation example 3 is an example where, while the throttle valve 13 is closed at the time of deceleration, the compressor flow rate QAIR is relatively large, and the operation point is spaced apart from the surging region. In this case, although it is determined that the second opening condition is met due to the closed throttle valve 13, the target compressor flow rate QAIRCMD does not drop below the first determination value QAIRABVOP, and therefore it is determined that the first opening condition is not met. As a result, opening of the AB valve 22 is prohibited, and the AB valve 22 is kept closed.

As has been described, according to the embodiment, both of first opening condition determination of determining whether to open the AB valve 22 on the basis of the target compressor flow rate QAIRCMD and the compressor front-rear pressure ratio P2/P1, and second opening condition determination of determining whether to open the AB valve 22 on the basis of the opening ratio reduction amount DRTHO are performed. Then, the AB valve 22 is opened only if both of the first and second opening conditions pie met. Hence, the likelihood of occurrence of surging can be determined more accurately by avoiding erroneous determination by using only one opening condition determination. With this, unnecessary opening of the AB valve 22 can be avoided to suppress frequent actuation thereof, and occurrence of surging can be surely prevented.

Moreover, the opening ratio RTHO of the throttle valve 13 is used as a parameter indicating the opening of the throttle valve 13, and is calculated according to the engine speed NE and the target throttle valve opening THCMD. Also, the second opening condition determination is made on the basis of the opening ratio reduction amount DRTHO as a reduction amount of the opening ratio RTHO. Hence, the second opening condition determination can be made accurately while correctly reflecting the reduction rate of the compressor flow rate QAIR. As a result, the determination accuracy of the first and second opening condition determinations as a whole is improved, whereby the effect of avoiding unnecessary opening of the AB valve 22 and surely preventing occurrence of surging can be achieved more favorably.

Furthermore, in the determination of the first opening condition, the target compressor flow rate QAIRCMD is used as the compressor flow rate, and is compared with the first determination value QAIRABVOP. Hence, as compared to using an actual compressor flow rate detected by the airflow sensor 32, for example, the second opening condition determination can be made with high accuracy and responsiveness without being affected detection errors of the sensor. Similarly, since the target throttle valve opening TH is used as the opening of the throttle valve 13 for calculating the opening ratio RTHO, the opening ratio RTHO can be calculated with high accuracy and responsiveness.

Note that the present invention is not limited to the described embodiment, and my be implemented in various forms. For example, in the embodiment, the opening ratio RTHO favorably expressing the throttle valve flow rate according to the throttle valve opening TH and the engine speed NE is used as the throttle valve opening parameter indicating the opening of the throttle valve 13. However, the invention is not limited to this, and the throttle valve opening TH may be used.

Additionally, in the embodiment, the target compressor flow rate QAIRCMD is used as the compressor flow rate compared with the first determination value QAIRABVOP in the first opening determination. Instead, an actual compressor flow rate QAIR detected by the airflow sensor 32 or the like may be used. Similarly, in the embodiment, the target throttle valve opening THCMD is used as the throttle valve opening for calculating the opening ratio RTHO in the second opening determination. Instead, an actual throttle valve opening TH detected by the throttle valve opening sensor 30 may be used. Moreover, the configuration of detailed parts may be modified appropriately within the gist of the invention.

The invention claimed is:
1. A system for controlling an internal combustion engine, comprising:
a turbocharger having a compressor disposed in an intake passage such that intake air is introduced into the compressor from an upstream side of the intake passage and is outputted to a downstream side of the intake passage, the compressor being configured to compress the intake aft which flows through the compressor;
an aft bypass valve provided in a bypass passage that connects the upstream side and the downstream side of the intake passage and allows the intake air to bypass, said compressor, said air bypass valve being configured to open and close the bypass passage so as to change a flow rate of the intake aft which flows through the bypass passage;
a compressor flow rate detector for detecting a flow rate of air passing through said compressor;
a compressor pressure ratio detector for detecting a compressor pressure ratio that is a pressure ratio between the upstream and downstream sides of said compressor;
a throttle valve opening degree detector for detecting an opening degree of a throttle valve arranged on the downstream side of said compressor; and
a controller configured to acquire the compressor flow rate based on a signal from said compressor flow rate detector, the compressor pressure ratio based on a signal from said compressor pressure ratio, and an amount of change in a throttle valve opening parameter that indicates the opening degree of the throttle valve from said throttle valve opening degree detector based on a signal from said throttle valve opening degree detector, the controller including instructions stored in a non-transitory media to execute:
first opening determination means for determining whether to open said aft bypass valve, on a basis of said acquired compressor flow rate and said detected compressor pressure ratio;

second opening determination means for determining whether to open said air bypass valve, on a basis of the amount of change in said acquired throttle valve opening parameter; and air bypass valve control means for allowing said air bypass valve to open when both of said first opening determination means and said second opening determination means determine said air bypass valve to be opened, while said aft bypass valve control means prohibits said opening of said air bypass valve when at least one of said first opening determination means and said second opening determination means determines said air bypass valve not to be opened.

2. The system according to claim 1, further comprising instructions to execute:

a speed detector for detecting a rotation speed of said internal combustion engine; and an opening ratio of said throttle valve being determined according to said rotation speed of the internal combustion engine having been detected;

wherein said opening ratio of said throttle valve is defined as a ratio between a flow rate of the intake air passing through said throttle valve at an arbitrary opening degree of said throttle valve and a maximum flow rate obtainable at said arbitrary opening degree.

* * * * *